Jan. 25, 1938.　　　R. L. SPURLIN　　　2,106,361
EJECTOR
Filed June 18, 1936
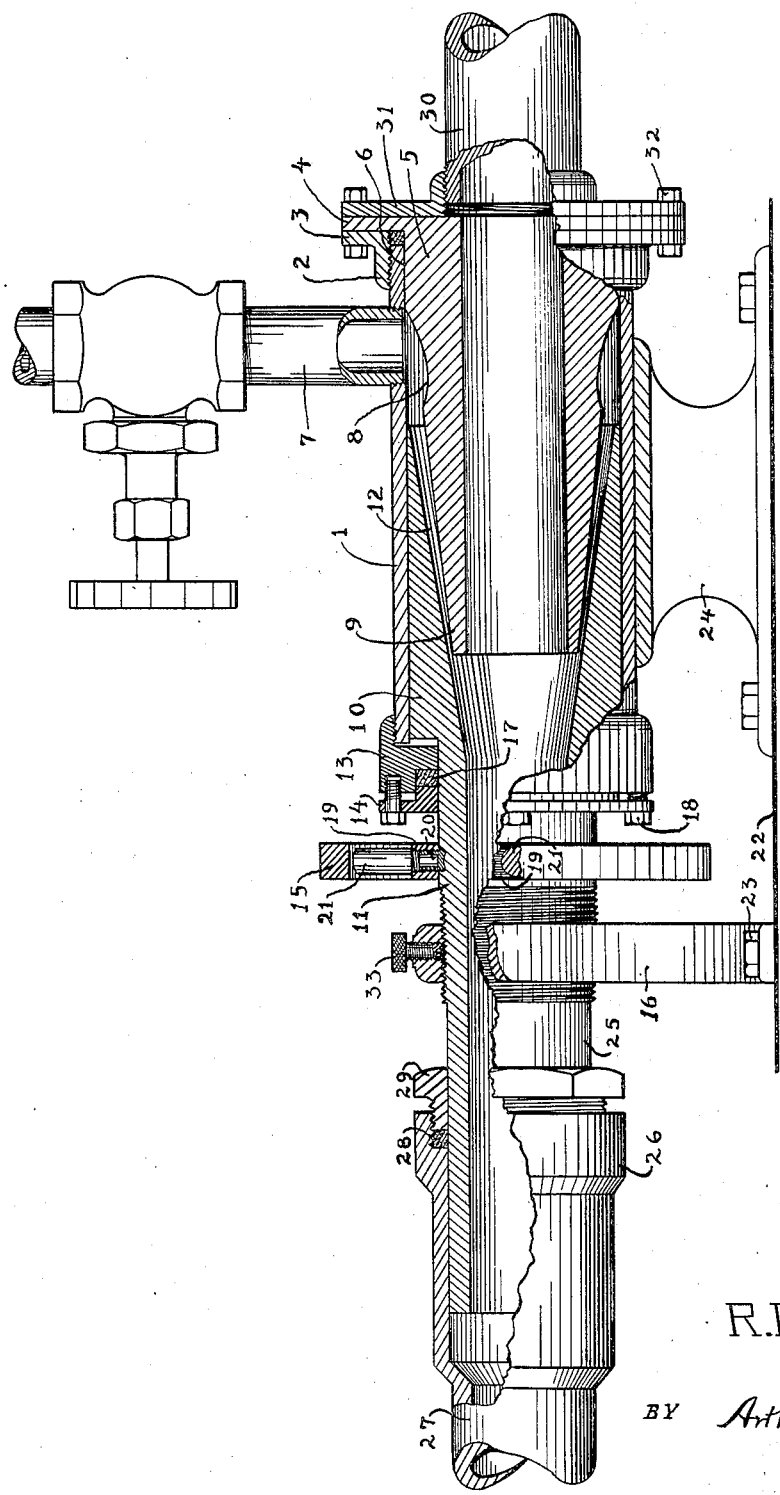
R.L. Spurlin
INVENTOR
BY Arthur Minnick
ATTORNEY Patented Jan. 25, 1938

2,106,361

UNITED STATES PATENT OFFICE 2,106,361

EJECTOR

Robert Lee Spurlin, Port Arthur, Tex.

Application June 18, 1936, Serial No. 85,915

6 Claims. (Cl. 103—262)

This invention relates to ejectors of the type in which fluids under pressure are used to produce suction to effect the bodily movement of loose materials.

A primary object of the invention is to provide a device of simple and inexpensive construction in which all elements may readily be taken apart and reassembled, and in which the necessary adjustments of the fluid pressure may be made manually without the removal of any part.

Other objects and advantages of the invention will appear in connection with the description of a preferred embodiment of the device selected for purposes of illustration in the accompanying drawing which represents a section taken vertically through the longitudinal axis of the device, with parts broken away and parts in elevation.

The cylindrical casing 1 is externally threaded at one end for the reception of a sleeve 2, to the flange 3 of which is secured the flange 4 of a suction nozzle 5. Adjacent to the flange 4, the nozzle 5 has a cylindrical portion 6 which fits tightly within the adjacent end of the casing 1. Inwardly from the portion 6, the casing receives a pipe 7 controlled by a valve and connected to any suitable source, (not shown), of fluid under pressure.

Opposite the end of the pipe 7, the nozzle is reduced in diameter at 8 throughout its circumference to furnish easy passage for the fluid, the smallest diameter of the passage being central of this portion of the nozzle, and from this annular passage, the nozzle is externally tapered to its inner end, as shown at 9. Surrounding this tapered end of the nozzle, is the inner end 10 of a discharge member 11 having its interior formed as a flaring passage 12, the angle of the passage walls being slightly greater than that of the tapered end 9 of the nozzle 5 so that the tip of the tapered portion can come into contact with the inner wall of the passage 12.

The member 11 is capable of longitudinal adjustment to bring it as close as may be desired to restrict the annular discharge orifice between the two members. The outer surface of the end portion 10 is cylindrical and has a close sliding and rotating fit within the end of the casing 1. At its central portion, the member 11 is reduced in diameter, to receive a sleeve 13, a packing ring or gland 14, a wheel or handle 15, and a bracket 16. The sleeve 13 is recessed and internally threaded on one end to be screwed upon the end of the casing 1, and on its other end, the sleeve 13 is formed with a recess for packing 17 which is forced into contact with the outer surface of the member 11 by screws 18 engaging the sleeve 13 and the gland 14.

The wheel 15 has a hub portion 19 sliding closely on the member 11 and secured thereto by the set screw 20, this hub 19 being connected with the rim of the wheel by spokes 21. The member 11, outwardly beyond the wheel, is threaded to engage within the internally threaded bracket 16 which is secured to the floor or base 22 by screws 23 at a proper distance from the base member 24 which carries the casing 1.

Rotation of the wheel 15 will cause the member 11 to turn within the bracket and within the casing and will cause it to move longitudinally toward or from the nozzle 5.

Farther out from the bracket, the member 11 is again reduced in diameter, with a smooth cylindrical surface at 25 to fit closely within the bell end 26 of an exhaust pipe 27. The length of the bell is sufficient to permit all necessary sliding movement of the member 11 without longitudinal movement of the discharge pipe, which may be connected with any suitable conduit to convey away the material entering through the intake pipe 30. The bell has a recess for packing 28 which is compressed by the gland 29.

The intake pipe 30 is provided with a flange union or sleeve 31 which is secured to the flange 4 of the nozzle 5 by the same bolts 32 which secure the flange 4 to the flange 3.

The bore of the intake pipe 30, of the nozzle 5, of the discharge member 11, and of the discharge pipe 27 is preferably of the same diameter in each.

Fluid under pressure admitted to the pipe 7 will pass around the nozzle through the passage at 8 to be discharged in a thin annular jet around the end of the tapered portion 9 of the nozzle 5 and will pass on out through the member 11 and the discharge pipe 27, creating a suction in the manner well known in the art. The handle 15 may be rotated while the fluid is passing to regulate the action of the jet, and when adjusted, the set screw 33 will hold the member 11 in position.

It will be evident that the construction herein set forth provides for ease in manufacture of the elements, simplicity of assembly, and ready adjustment of the jet during operation without disturbing either the intake or discharge connections.

The device is intended especially for use on shipboard for discharging ashes, but it is also adapted for dredging and excavation, for cleaning up rubbish, and for other purposes for which a partial vacuum is maintained.

Many changes may be made in form, proportions, and in the details of arrangement and construction of parts without departing from the invention as claimed.

I claim:

1. An ejector comprising a cylindrical casing, an intake nozzle within said casing, a discharge pipe, a bracket between the said casing and the discharge pipe and held in fixed relation to said casing and to said pipe, and a discharge member having a cylindrical portion slidably mounted within the said casing and cooperating with said intake nozzle, having a cylindrical portion slidably mounted within the said discharge pipe, and having an intermediate portion having screw-threaded engagement with said bracket, whereby rotation of said discharge member will cause longitudinal sliding movement thereof within said casing and within said discharge pipe.

2. An ejector comprising a casing, an intake nozzle having a cylindrical portion having a sliding fit within one end of said casing, having a second portion thereof with its control diameter smaller than that of its ends to provide an annular passage between the said nozzle and the casing, and having a third portion tapering to the inner end of said nozzle, a longitudinally adjustable discharge member having a cylindrical portion having a sliding fit within said casing and having a flaring interior passage to receive the tapering portion of the nozzle and form an annular orifice between the tip of the nozzle and the wall of the passage, and means for introducing a fluid under pressure into the annular passage surrounding said nozzle.

3. A construction as in claim 2, in which the angle of the wall of the flaring passage with respect to its axis is greater than the angle of the surface of the tapering portion of the nozzle with respect to the same axis whereby the tip of the tapering portion of the nozzle may be moved into contact with the inner wall of the flaring passage.

4. A construction as in claim 2, in which the discharge member has a screw-threaded portion outside of the casing, the device having a bracket engaging the said screw-threaded portion for rotation of the discharge member therein, and means for rotating the discharge member whereby to adjust the size of the said annular orifice.

5. An ejector comprising a cylindrical casing, an intake nozzle within said casing, a discharge pipe, a bracket secured in fixed relation to said casing between said casing and said discharge pipe, a discharge member having a cylindrical portion slidably mounted at one end within said casing, and slidably mounted at its other end within said discharge pipe, and having a portion outside of said casing in screwthreaded engagement with said bracket, and means for rotating said discharge member within the bracket whereby to slide said member longitudinally of the casing and of said discharge pipe to adjust its relation to said nozzle.

6. An ejector comprising a casing having an intake member, an internally threaded bracket secured in fixed relation to said casing, a discharge member slidable longitudinally in the casing, a packing gland between the casing and the discharge member, the discharge member having a portion outside of the casing in threaded engagement with said bracket, and means for rotating said discharge member within the bracket to move it to and fro in the casing.

ROBERT LEE SPURLIN.